(12) United States Patent
Joyce et al.

(10) Patent No.: US 7,805,592 B2
(45) Date of Patent: Sep. 28, 2010

(54) EARLY RESOLVING INSTRUCTIONS

(75) Inventors: Nicholas Paul Joyce, Reading (GB);
Nigel Peter Topham, Midlothian (GB)

(73) Assignee: Altera Corporation, San Jose, CA (US)

( * ) Notice: Subject to any disclaimer, the term of this patent is extended or adjusted under 35 U.S.C. 154(b) by 286 days.

(21) Appl. No.: 10/491,944

(22) PCT Filed: Oct. 7, 2002

(86) PCT No.: PCT/GB02/04524

§ 371 (c)(1),
(2), (4) Date: Sep. 21, 2004

(87) PCT Pub. No.: WO03/034205

PCT Pub. Date: Apr. 24, 2003

(65) Prior Publication Data

US 2005/0033941 A1    Feb. 10, 2005

(30) Foreign Application Priority Data

Oct. 12, 2001    (GB) ................................ 0124556.2

(51) Int. Cl.
*G06F 9/32* (2006.01)
(52) U.S. Cl. ..................................... 712/207
(58) Field of Classification Search ................. 712/207
See application file for complete search history.

(56) References Cited

U.S. PATENT DOCUMENTS

| | | | | |
|---|---|---|---|---|
| 4,991,078 A * | 2/1991 | Wilhelm et al. | ............. | 712/218 |
| 5,752,263 A | 5/1998 | Kranich | ...................... | 711/137 |
| 5,845,101 A * | 12/1998 | Johnson et al. | ............. | 712/207 |
| 5,860,000 A * | 1/1999 | Biswas et al. | ............... | 712/244 |
| 6,279,100 B1 * | 8/2001 | Tremblay et al. | ............. | 712/24 |
| 6,457,117 B1 * | 9/2002 | Witt | .......................... | 712/213 |

FOREIGN PATENT DOCUMENTS

| | | |
|---|---|---|
| EP | 0 459 232 | 12/1991 |
| EP | 0 950 946 | 10/1999 |
| GB | 2 362 733 | 11/2001 |
| JP | 61-217834 | 9/1986 |
| WO | WO 99/14666 | 3/1999 |

OTHER PUBLICATIONS

Patterson, David. Hennessy, John. "Computer Architecture: A Quantitative Approach". Morgan Kaufmann Publishers, Second Edition 1996. pp. 136-137.*

(Continued)

*Primary Examiner*—Eddie P Chan
*Assistant Examiner*—Robert Fennema
(74) *Attorney, Agent, or Firm*—Greer, Burns & Crain, Ltd.

(57) ABSTRACT

Techniques are disclosed for handling control transfer instructions in pipelined processors. Such instructions may cause the sequence of subsequent instructions to change, and thus may require subsequent instructions to be deleted from the processor's pipeline. Pre-decode means (110) are provided for at least partially decoding control transfer instructions early in the pipeline. Subsequent instructions can then be prevented from progressing through the pipeline. The mechanism required to delete unwanted instructions is thereby simplified.

18 Claims, 8 Drawing Sheets

OTHER PUBLICATIONS

Hennessy, John. Patterson, David. "Computer Architecture: A Quantitative Approach". Second Edition, Morgan Kaufmann Publishers Inc. 1996, p. 169.*

"Efficient Scheme to Reduce Over-Prefetching of Instructions for Loading an Instruction Buffer"; *IBM Technical Disclosure Bulletin*; Vo. 33, No. 3B; Aug. 1, 1990; pp. 483-385.

* cited by examiner

| cycle | VTIA | IF | D | X1 | X2 | X3 | C | comments |
|---|---|---|---|---|---|---|---|---|
| 1 | loop | | | | | | | loop detected in VTIA |
| 2 | lb1 | loop | | | | | | VTIA stalled |
| 3 | lb1 | - | loop | | | | | |
| 4 | lb1 | - | - | loop | | | | stall removed |
| 5 | lb1 | - | - | - | loop | | | lb1 reloaded in VTIA |
| 6 | lb2 | lb1 | - | - | - | loop | | |
| 7 | lb3 | lb2 | lb1 | - | - | - | loop | |

Fig.11

| cycle | VTIA | IF | D | X1 | X2 | X3 | C | comments |
|---|---|---|---|---|---|---|---|---|
| 1 | branch | | | | | | | branch detected |
| 2 | a | branch | | | | | | VTIA stalled |
| 3 | a | - | branch | | | | | |
| 4 | a | - | - | branch | | | | stall removed |
| 5 | bt | - | - | - | branch | | | a squashed; bt loaded in VTIA |
| 6 | bt+1 | bt | - | - | - | branch | | bt is a v-cache hit |
| 7 | bt+2 | bt+1 | bt | - | - | - | branch | |

Fig.12

| cycle | VTIA | IF | D | X1 | X2 | X3 | C | comments |
|---|---|---|---|---|---|---|---|---|
| 1 | rv | | | | | | | rv detected in VTIA |
| 2 | a | rv | | | | | | VTIA stalled |
| 3 | a | - | rv | | | | | |
| 4 | a | - | - | rv | | | | stall removed |
| 5 | b | - | - | - | rv | | | a squashed; b loaded |
| 6 | c | - | - | - | - | rv | | b squashed; c loaded |
| 7 | d | - | - | - | - | - | rv | c squashed; d loaded |

Fig.13

EARLY RESOLVING INSTRUCTIONS

The present invention relates to parallel pipelined processors, such as very long instruction word (VLIW) processors. The present invention is particularly concerned with the way in which certain control instructions are handled in such processors. Such control instructions may be instructions which, if executed, cause the sequence of subsequent instructions to change. Such instructions are referred to herein as control transfer instructions.

Modern processors use a technique known as pipelining to increase the rate at which instructions can be processed. Pipelining works by executing an instruction in several phases, with each phase being executed in a single pipeline stage. Instructions flow through successive pipeline stages, and complete execution when they reach the end of the pipeline.

Some processor architectures provide two or more parallel pipelines for processing different instructions, or different parts of an instruction, simultaneously. For example, VLIW processors use long instruction packets which may be divided into smaller instructions for simultaneous execution in different processor pipelines. Typically the address of an instruction packet is computed by one of the pipelines (the "master" pipeline), and the computed address is distributed to the other pipelines (the "slave" pipelines). Each pipeline then fetches its own instruction, and decodes and executes that instruction. Each of these operations is normally carried out in a separate pipeline stage.

The ability of the master pipeline to compute the address of an instruction relies on the fact that the next address can be predicted in advance with a fair degree of certainty. For example, if the processor is running a loop, then the address of the next instruction will, in most cases, be either the next address in memory, or the address of the first instruction in the loop. Thus the processor is able to compute the addresses of instructions and load the instructions into the pipelines in earlier pipeline stages while preceding instructions are still being decoded and executed in later pipeline stages.

A problem in the arrangement described above is that certain instructions, when decoded and executed, may cause the addresses of subsequent instructions to be different from those already computed by the processor. For example a branch instruction, if acted on, causes the processor to jump to an address which is not the next address in memory. In such a situation, some or all of the instructions which are in earlier pipeline stages must be removed from the pipelines ("squashed"), because they may have been loaded from the incorrect address. In parallel pipelined processors, the removal of such unwanted instructions may require a large amount of logic, which may add to the chip area of the processor and potentially slow down the operating speed of the processor.

According to a first aspect of the present invention there is provided a processor comprising a plurality of parallel pipelines for performing a series of operations on instructions from an instruction packet passing through the pipelines, wherein the processor is arranged such that, in operation, an instruction in a first pipeline is at least partially decoded before an instruction from a subsequent instructions packet is fetched by a second pipeline.

By arranging for an instruction in a first pipeline to be at least partially decoded before an instruction from a subsequent instruction packet is fetched by a second pipeline, appropriate action can be taken in response to the instruction at an early stage. For example, if the instruction is a control transfer instruction, then subsequent instructions may be prevented from being loaded into the pipelines until the processor has correctly computed the address of the next instruction. This may simplify the mechanism required to delete unwanted instructions, or remove the need for such a mechanism altogether.

The second pipeline may comprise an instruction fetch stage, and the first pipeline may comprise pre-decode means for at least partially decoding the instruction, which pre-decode means may be provided either in a stage corresponding to the instruction fetch stage in the second pipeline, or in an earlier stage.

The pre-decode means may be arranged to determine whether the instruction is an instruction which, if executed, may cause a sequence of subsequent instructions to be different from that if the instruction was not executed. Such an instruction may be, for example, a control transfer instruction. The pre-decode means may be arranged to determine whether the instruction is one of a predetermined set of instructions. The predetermined set of instructions may comprise, for example, one or more of a loop instruction, a branch instruction, a return-from-VLIW-mode instruction, an exit instruction (causing the processor to exit from a loop), a subroutine call instruction and/or other instructions. The predetermined set of instruction preferably comprises instructions that may only be executed by the first pipeline.

It will be appreciated from the above that, in accordance with embodiments of the present invention, action may be taken in response to certain control transfer instructions at an earlier stage in the processor pipeline than would normally be the case. Such instructions are referred to as early resolving control transfer instructions.

The processor may further comprise stalling means for stalling the progress of subsequent instructions through the pipelines in dependence on a result of the partial decoding of the instruction. In this way, subsequent instructions can be prevented from being loaded into and/or progressing through the pipelines, for example, if the instruction is a control transfer instruction. However, the stalling means may be arranged such that a subsequent instruction remains in at least one stage (e.g. the first stage) of the first pipeline while a stall is asserted. In this case, if the control transfer instruction is not executed, then the subsequent instruction which was held in the first pipeline may still be used. If the control transfer instruction is executed, then the subsequent instruction held in the first pipeline may need to be deleted, but the mechanism required to achieve this can be implemented relatively easily.

The first pipeline may comprise an execute stage, the execute stage comprising means for determining whether an instruction in the execute stage is to be executed. By this stage, the processor may be able to compute the address of a subsequent instruction correctly. Thus the stalling means may be arranged to release a stall when it has been determined whether an instruction which caused the stall is to be executed.

The processor may further comprise means for deleting a subsequent instruction if it is determined that the instruction which caused the stall is to be executed. This may be necessary, in particular, if the stalling means is arranged such that a subsequent instruction remains in the first pipeline while a stall is asserted.

The processor may be arranged such that, in dependence on a result of the partial decoding of the instruction (e.g if it is determined that the instruction is an early resolving control transfer instruction), an instruction from a subsequent instruction packet is prevented from being loaded into the second pipeline in an executable form. By this it may be meant, for example, that the instruction from the subsequent instruction packet is not loaded into the second pipeline at all in the next clock cycle, or that the second pipeline contains some indication that the instruction is to be ignored, such as a cache miss signal. In this way, it may not be necessary to delete any unwanted instructions from the second pipeline if a control transfer instruction is executed in the first pipeline.

The first pipeline preferably comprises a decode stage for fully decoding an instruction, the decode stage being after the stage in which the instruction is at least partially decoded, and preferably before an execute stage.

Each of the pipelines may have an instruction fetch means for fetching an instruction to be executed, and the instruction fetch means in the first pipeline may be in an earlier pipeline stage than the instruction fetch means in the second pipeline. For example, the instruction fetch means in the first pipeline may be in the same pipeline stage as the pre-decode means. In this way, an instruction may be fetched and partially decoded in the first pipeline before an instruction from the same instruction packet has been fetched in the second pipeline. Thus, if the instruction in the first pipeline is a control transfer instruction, then appropriate action (such as stalling the pipelines) may be taken before the corresponding instruction has been loaded into the second pipeline. This can allow the mechanism for deleting any unwanted instructions from the pipelines to be simpler than would otherwise be the case.

The processor may be arranged such that corresponding instructions in different pipelines may become unaligned for at least one clock cycle. This may be due to, for example, stall signals taking effect in different pipelines in different clock cycles. Such an arrangement would normally result in a complicated mechanism for deleting unwanted instructions. Thus the present invention may advantageously be used with such an arrangement, since it may simplify the mechanism required for deleting unwanted instructions.

The processor may comprise a plurality of pipeline clusters, each cluster comprising a plurality of pipelines, the first pipeline being in a first cluster and the second pipeline being in a second cluster. The processor may be, for example, a very long instruction word processor in which instructions are issued in parallel to the plurality of pipelines.

The feature that different pipelines fetch instructions in different pipeline stages is an important part of the present invention and may be provided independently. Thus, according to a second aspect of the present invention, there is provided a processor comprising a plurality of parallel pipelines for performing a series of operations on instructions from an instruction packet passing through the pipelines, each of the pipelines comprising instruction fetch means for fetching an instruction from the instruction packet, wherein the instruction fetch means in one pipeline is in a different pipeline stage from the instruction fetch means in another pipeline.

Corresponding methods are also provided. Thus, according to a third aspect of the invention, there is provided a method of operating a processor, the processor comprising a plurality of parallel pipelines for performing a series of operations on a group of instructions passing through the pipelines, the method comprising at least partially decoding an instruction in a first pipeline before an instruction from a subsequent group of instructions is fetched by a second pipeline.

Features of one aspect of the invention may be applied to any other aspect. Apparatus features may be applied to the method aspects and vice versa.

Preferred features of the present invention will now be described, purely by way of example, with reference to the accompanying drawings, in which:—

Figures 4, 5:
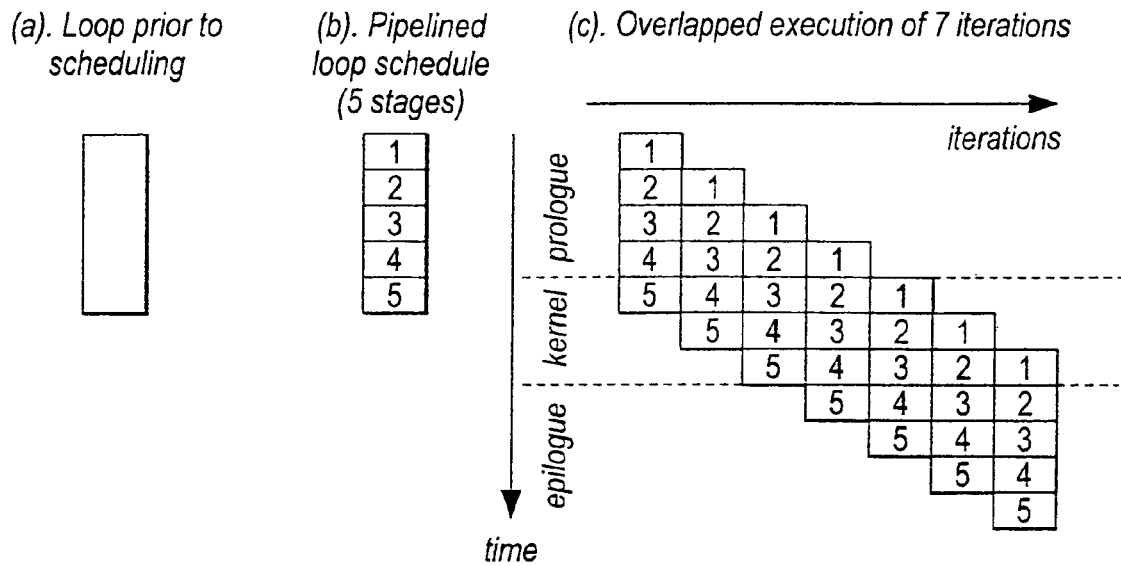
Figure 6:
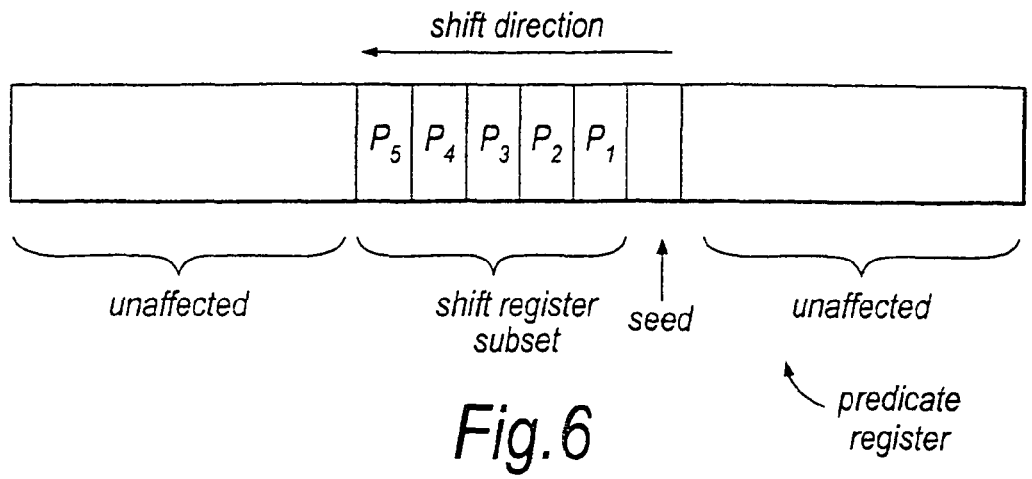
Figure 7:
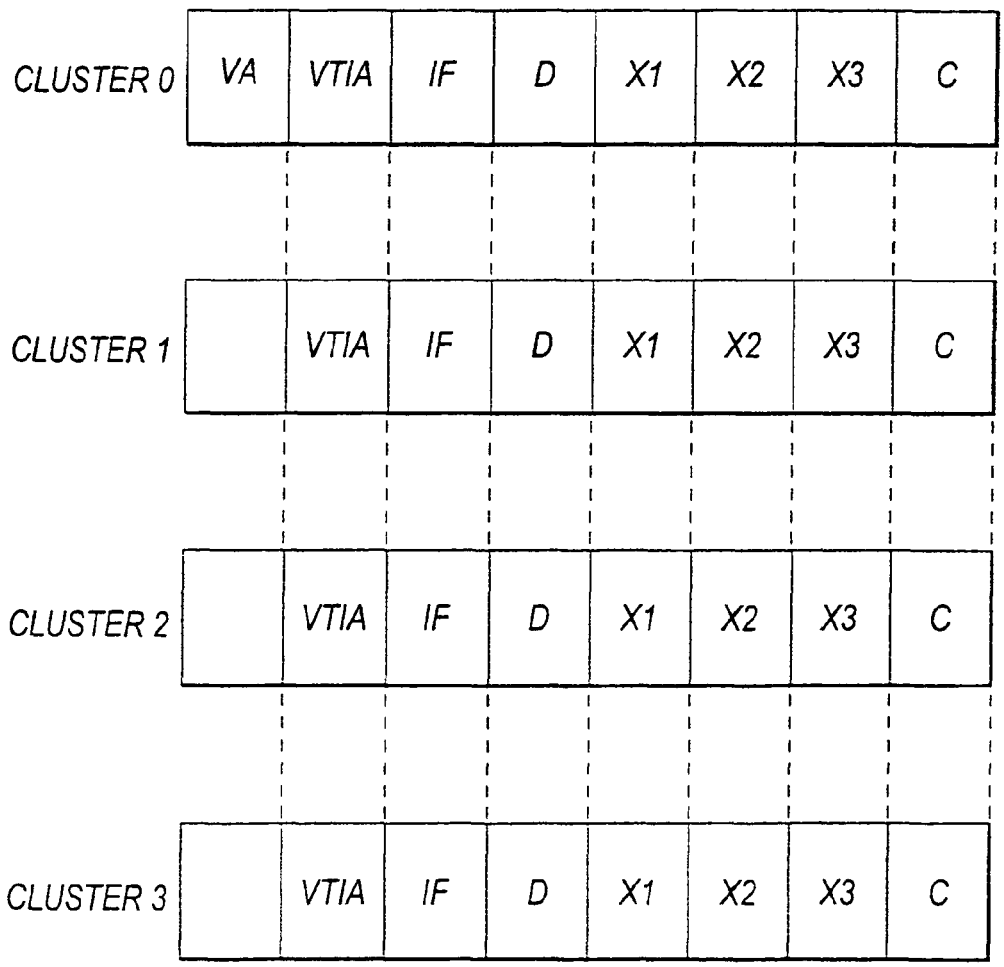
Figure 8:
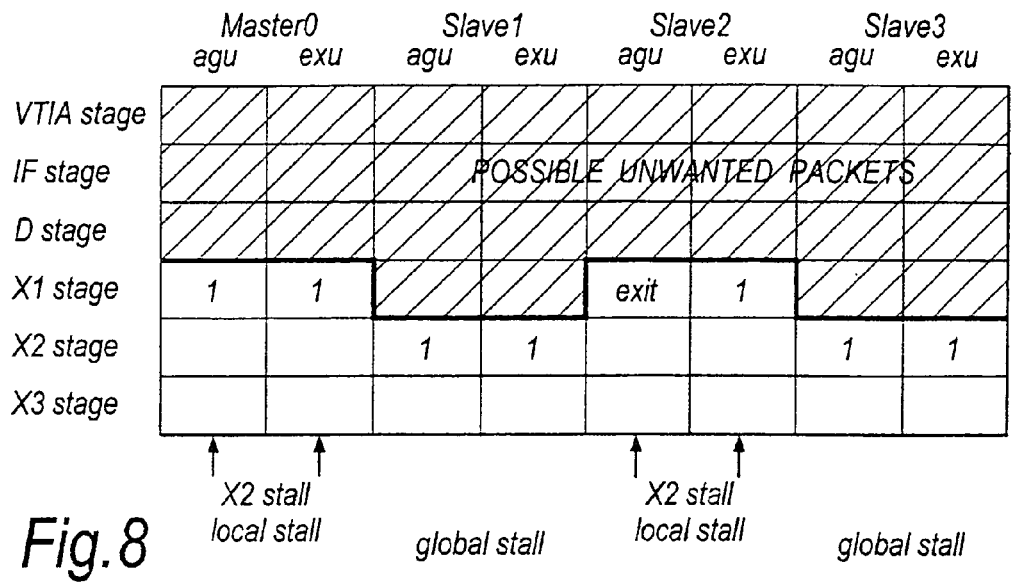
Figure 10A:
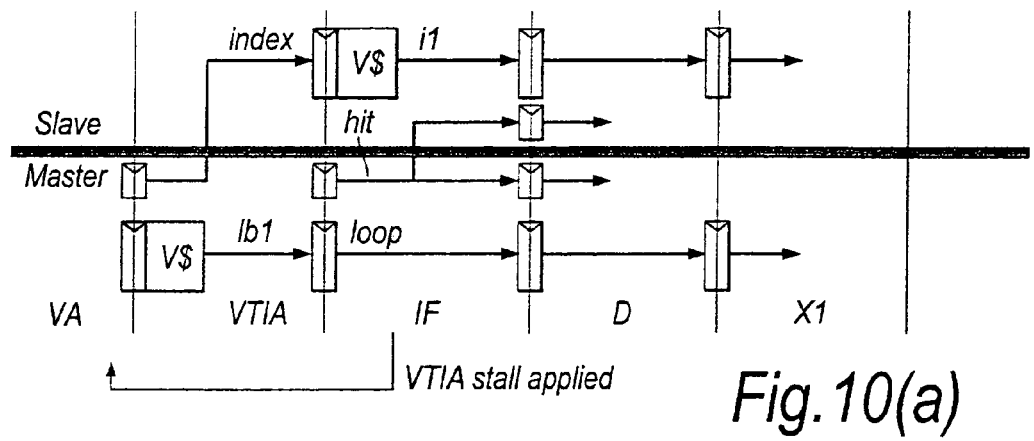
Figure 10B:
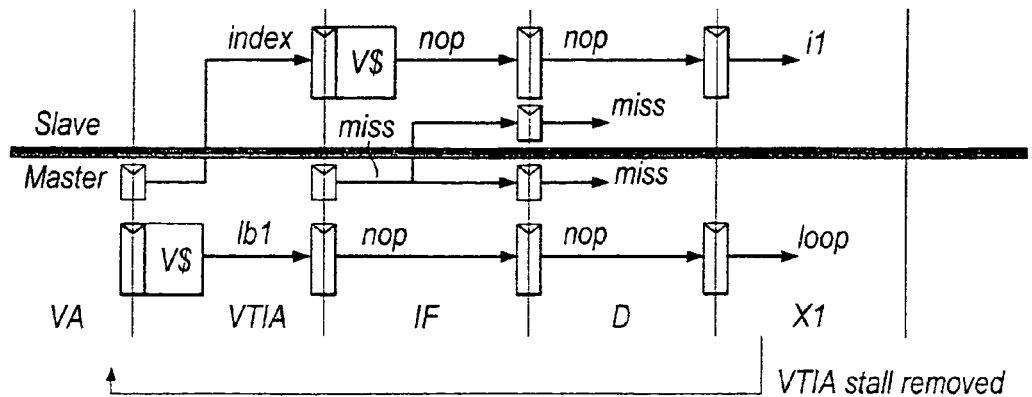
Figure 9:
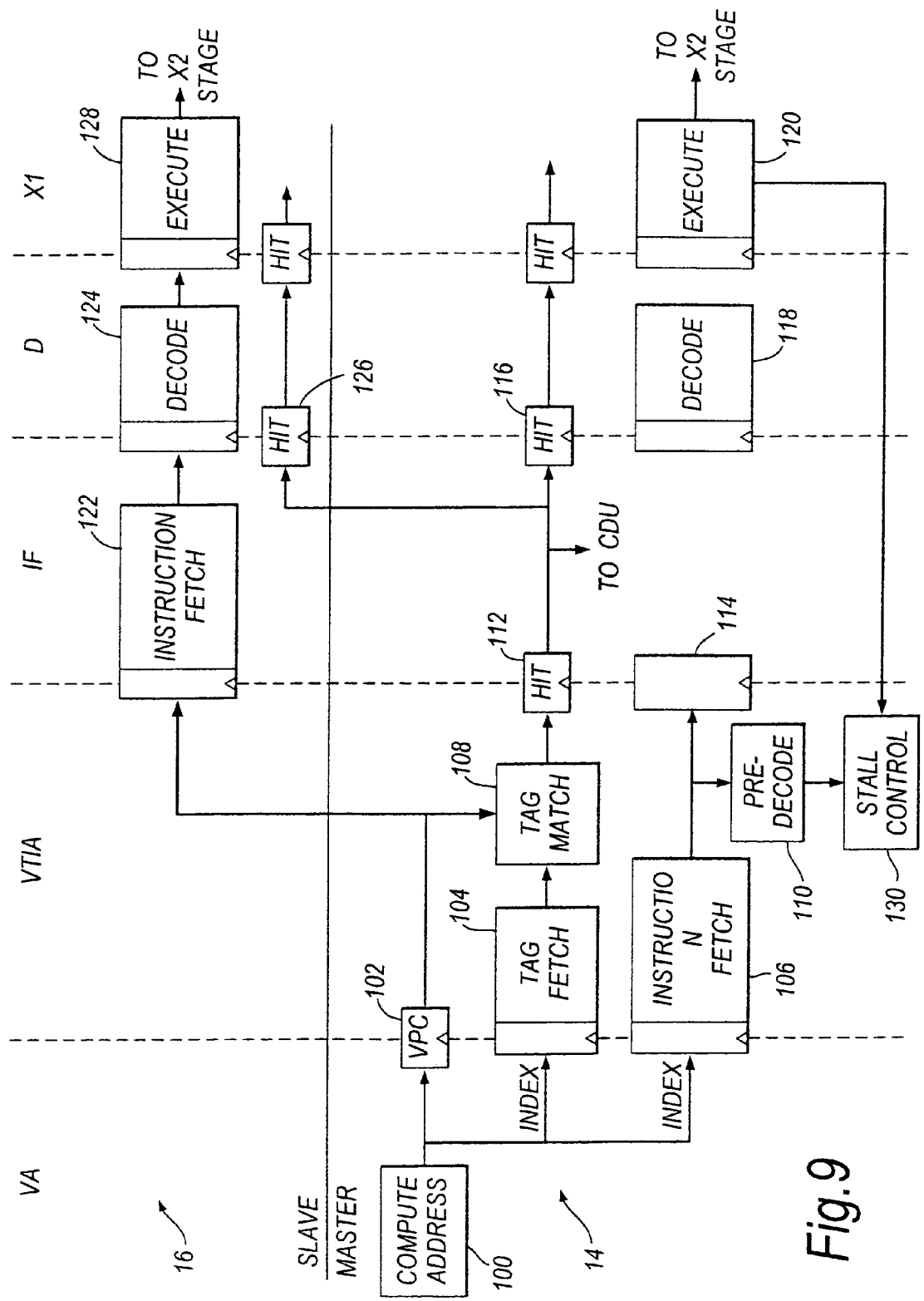

FIGS. 4(a), 4(b) and 4(c) show an example of a software pipelined loop;

FIG. 5 shows the use of predicates in a software pipeline loop;

FIG. 6 shows how a predicate register may be used to produce the predicates of FIG. 5;

FIG. 7 shows various pipeline stages in a processor embodying the invention;

FIG. 8 shows an example of unaligned stale instruction packets;

FIG. 9 shows parts of a processor in accordance with an embodiment of the present invention;

FIGS. 10(a) and 10(b) show the processor of FIG. 9 with a loop instruction in the IF and X1 stages respectively; and FIGS. 11 to 13 illustrate the operation of a processor embodying the invention using the examples of loop, branch and rv instructions respectively.

OVERVIEW OF A PARALLEL PIPELINED PROCESSOR

Figure 1:
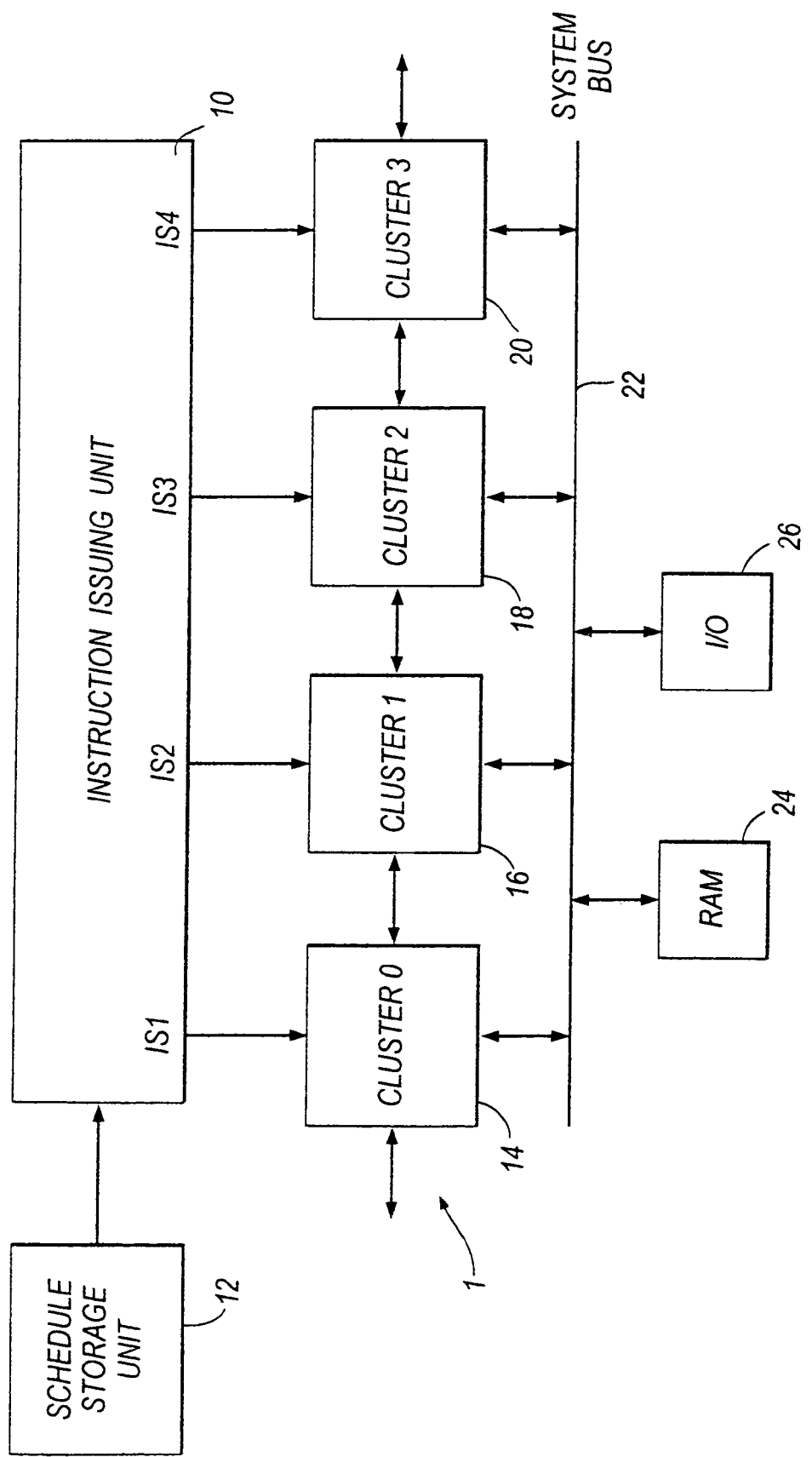
FIG. 1 shows an overview of a processor embodying the present invention.

FIG. 1 shows an overview of a parallel pipelined processor embodying the present invention. The processor 1 comprises instruction issuing unit 10, schedule storage unit 12, first, second, third and fourth processor clusters 14, 16, 18, 20 and system bus 22 connected to random access memory (RAM) 24, and input/output devices 26. As will be explained, each of the clusters 14, 16, 18, 20 contains a number of execution units having a shared register file.

The processor 1 is designed to operate in two distinct modes. In the first mode, referred to as scalar mode, instructions are issued to just the first cluster 14, and the second to fourth clusters 16, 18, 20 do not perform any computational tasks. In the second mode, referred to as VLIW mode, instructions are issued in parallel to all of the clusters 14, 16, 18, 20, and these instructions are processed in parallel. A group of instructions issued in parallel to the various clusters in VLIW mode is referred to as a VLIW instruction packet. In practice, the processor architecture may be configured to include any number of slave clusters. Each VLIW instruction packet contains a number of instructions (including no-operation instructions) equal to the total number of clusters times the number of execution units in each cluster.

When the processor is in VLIW mode, VLIW instruction packets are passed from the schedule storage unit 12 to the instruction issuing unit 10. In this example, the VLIW instruction packets are stored in compressed form in the schedule storage unit 12. The instruction issuing unit 10 decompresses the instruction packets and stores them in a cache memory, known as the V-cache. The various constituent instructions in the instruction packets are then read out from the V-cache and fed to the clusters 14, 16, 18, 20 via the issue slots IS1, IS2, IS3, IS4 respectively. In practice, the functions of the instruction issuing unit 10 may be distributed between the various clusters 14, 16, 18, 20. Further details of the instruction issuing unit 10 may be found in United Kingdom patent application number 0012839.7 in the name of Siroyan Limited, the entire subject matter of which is incorporated herein by reference.

Figure 2:
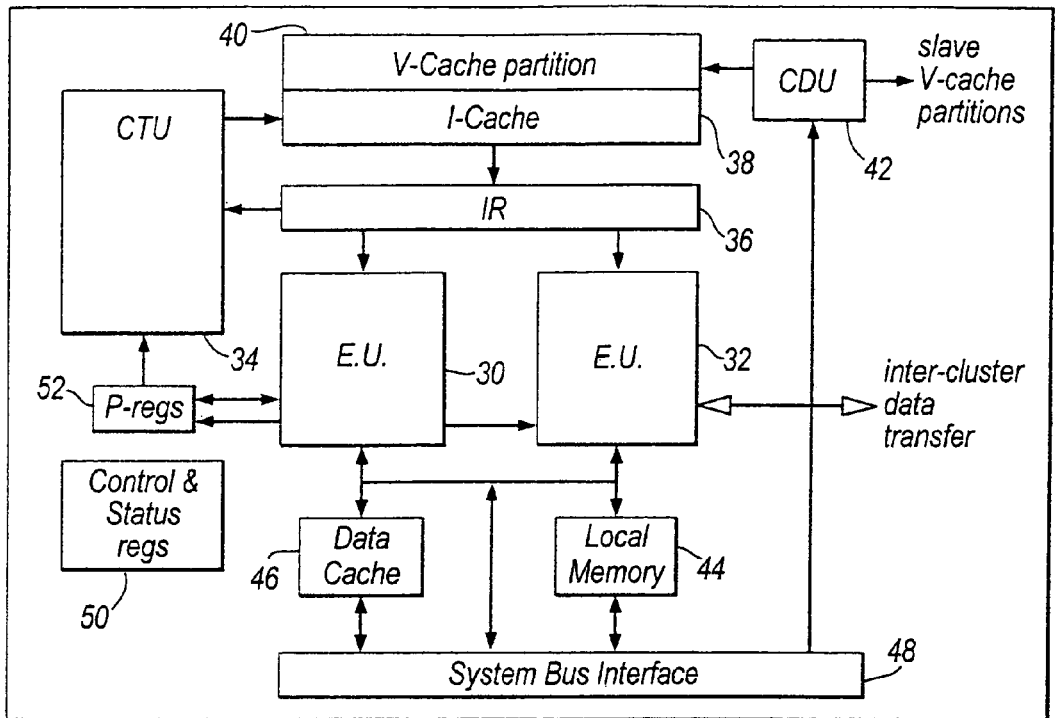
FIG. 2 is a block diagram of a master cluster in a processor embodying the invention.

The master cluster 14 controls the overall operation of the processor 1. In addition, certain control instructions are always sequenced so that they will be executed in the master cluster. The block structure of the master cluster 14 is shown in FIG. 2. The master cluster comprises first and second execution units 30, 32, control transfer unit (CTU) 34, instruction register 36, I-cache 38, V-cache partition 40, code decompression unit (CDU) 42, local memory 44, data cache 46, system bus interface 48, control and status registers 50, and predicate registers (P-regs) 52.

In operation, when the processor is in scalar mode, instructions are fetched one at a time from the I-cache 38 and placed in the instruction register 36. The instructions are then executed by one of the execution units 30, 32 cr the control transfer unit 34, depending on the type of instruction. If an I-cache miss occurs, a cache controller (not shown) arranges for the required cache block to be retrieved from memory.

When the processor is in VLIW mode, two instructions are fetched in parallel from the V-cache partition 40 and are placed in the instruction register 36. The V-cache partition 40 is the part of the V-cache which stores VLIW instructions which are to be executed by the master cluster 14. The two instructions in the instruction register are issued in parallel to the execution units 30, 32 and are executed simultaneously. The V-cache partitions of all clusters are managed by the code decompression unit 42. If a V-cache miss occurs, the code decompression unit 42 retrieves the required cache block, which is stored in memory in compressed form, decompresses the block, and distributes the VLIW instructions to the V-cache partitions in each cluster. An address in decompressed program space is referred to as an imaginary address. A VLIW program counter (VPC) points to the imaginary address of the current instruction packet. As well as the VLIW instructions, V-cache tags are also stored in V-cache partition 40, to enable the code decompression unit 42 to determine whether a cache miss has occurred.

Figure 3:
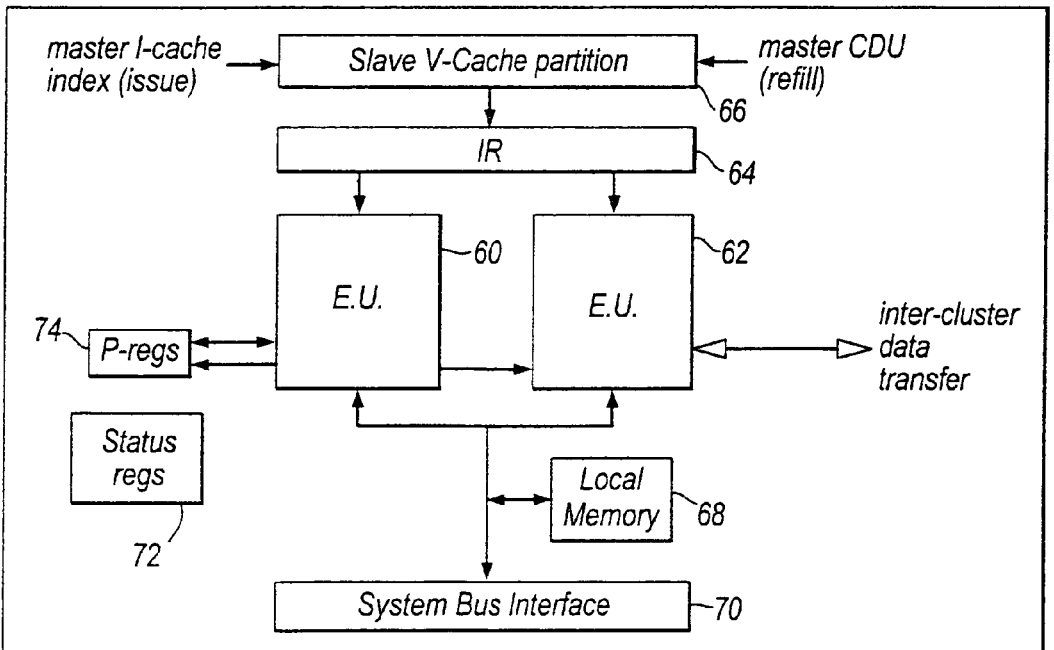
FIG. 3 is a block diagram of a slave cluster in a processor embodying the invention.

FIG. 3 shows the block structure of a slave cluster 16. The slave cluster 16 comprises first and second execution units 60, 62, instruction register 64, V-cache partition 66, local memory 68, system bus interface 70, status registers 72, and predicate registers (P-regs) 74. When the processor is in VLIW mode, instruction execution is controlled by the master cluster 14, which broadcasts an address corresponding to the next instruction packet to be issued. The instructions in the instruction packet are read from the V-cache partition in each cluster, and proceed in parallel through the execution units 60, 62.

A contiguous sequence of VLIW instruction packets is referred to as a VLIW code schedule. Such a code schedule is entered whenever the processor executes a branch to VLIW mode (by) instruction in scalar mode. The code within a VLIW schedule consists of two types of code section: linear sections and loop sections. On entry to each VLIW code schedule, the processor begins executing a linear section. This may initiate a subsequent loop section by executing a loop instruction. Loop sections iterate automatically, terminating when the number of loop iterations reaches the value defined by the loop instruction. It is also possible to force an early exit of a loop by executing an exit instruction. When the loop section terminates a subsequent linear section is always entered. This may initiate a further loop section, or terminate the VLIW schedule (and cause a return to scalar mode) by executing an return from VLIW mode (rv) instruction.

A loop section is entered when the loop initiation instruction (loop) is executed. This sets up the loop control context and switches the processor into VLIW loop mode. The processor then executes the loop section code repeatedly, checking that the loop continuation condition still holds true prior to the beginning of each iteration (excluding the first iteration).

The loop control operation involves a number of registers which are provided in the master cluster. These registers are described below.

LVPC—loop start VPC value. This points to the imaginary address of the first packet in the loop section. It is loaded from VPC+1 when the loop instruction is executed and is used to load the value back to VPC at the end of each loop iteration to allow VPC to return to the start of the loop.

VPC—VLIW program counter. This points to the imaginary address of the current packet. It is loaded from LVPC at the end of every loop iteration or is simply incremented by 1. It is also incremented by the literal from a branch instruction when the branch instruction is executed.

LPC—loop start PC value. This points to the start of the first compressed frame in memory in the block that contains the first packet in the loop section. It used when refilling the V-cache.

PC—program counter. When in VLIW mode, this points to the start of the current compressed block in memory.

IC—iteration count. This register is used to count the number of loop iterations, and is decremented for each iteration of the loop. It is loaded whenever the loop instruction is executed before entering the loop section.

EIC—epilogue iteration count. This register is used to count the number of loop iterations during the shutdown (epilogue) phase of a software pipelined loop (see below).

CC—compression count. This indicates the size of the compressed block and is used for updating the value of PC.

LSize—loop size. This register contains the number of packets in the loop sequence. It is loaded whenever the loop instruction is executed. The loop instruction explicitly defines the number of packets in the loop section.

LCount—This register counts the number of loop packets, and is decremented with each new packet. When LCount becomes zero a new loop iteration is initiated. LCount is loaded from LSize at the beginning of a new loop iteration.

The above registers are all "early modified", that is, they are modified before the processor has committed to a change in the processor context due to the instruction. Each register has a backup register in order to be able to restore the processor to its last committed state when performing exception handling.

Typically, a linear section of VLIW code is used to set up the context for the execution of a software pipelined loop. A software pipelined loop works by executing different iterations of the same loop in different clusters in an overlapped manner. FIG. 4 shows an illustrative example of a software pipelined loop. FIG. 4(a) shows the loop prior to scheduling. The loop contains a plurality of instructions which are to be executed a number of times (seven in this example). FIG. 4(b) shows the loop scheduled into five stages, each stage containing a number of instructions. The first stage contains the instructions which are required to be executed before a subsequent iteration can be started. This stage has a length referred to as the initiation interval. The other stages are arranged to be of the same length. FIG. 4(c) shows how the various iterations of the loop schedule are sequenced in the clusters. In this example, a total of seven iterations of a loop schedule are executed, and it is assumed that seven clusters are available. Each iteration is executed in a different execution unit, with the start times of the iterations staggered by the initiation interval.

Referring to FIG. 4(c), it can be seen that the pipeline loop schedule is arranged into a prologue (startup) phase, a kernel phase and an epilogue (shutdown) phase. The prologue and epilogue phases need to be controlled in a systematic way. This can be done through use of the predicate registers 52, 74 shown in FIGS. 2 and 3. The predicate registers 52, 74 are used to guard instructions passing through the pipelines either true or false. If an instruction is guarded true then it is executed, while if an instruction is guarded false then it is not executed and it is converted into a no-operation (NOP) instruction. In order to control the prologue and epilogue phases of a software pipeline loop, all instructions in pipeline stage i are tagged with a predicate $P_i$. $P_i$ is then arranged to be true whenever pipeline stage i should be enabled. FIG. 5 shows how the predicates for each software pipeline stage change during the execution of the loop.

In order to change the predicates during the execution of the loop, the predicate values are stored in a shifting register, which is a subset of one of the predicate registers, as shown in FIG. 6. A further bit in the predicate register contains a value known as the predicate seed. The shift register subset initially contains the values 00000. When a loop is to be started, a 1 is loaded into the predicate seed. This 1 is shifted into the shift register subset prior to the first iteration, so that the values stored therein become 00001. This turns on pipeline stage 1, but leaves stages 2 through 5 disabled. When the first stage of the pipeline loop has completed (i.e. after a number of cycles equal to the initiation interval), the values in the shift register are shifted to the left, so that the shift register subset contains the values 00011. This pattern continues until the shift register subset contains the values 11111. All of the software pipeline stages are then turned on, and the loop is in the kernel phase.

When a number of iterations equal to the iteration count have been executed (in this case seven), the seed predicate is then set to zero. At this point the loop enters the epilogue phase, and zeros are shifted into the shift register subset to turn off the software pipeline stages in the correct order. When all of the pipeline stages have been turned off and the shifting predicate register contains 00000 again the loop has completed. The processor then exits the loop mode and enters the subsequent linear section.

At any time the loop itself can initiate an early shutdown by executing an exit instruction. When an exit instruction is executed in any cluster the effect is to clear the seed predicate in all clusters. This causes all clusters to enter the loop shutdown phase after completing the current loop iteration.

Further details on the use of predicates in software pipelined loops may be found in United Kingdom patent application number 0014432.9 in the name of Siroyan Limited, the entire subject matter of which is incorporated herein by reference.

Processors embodying the present invention are hardware pipelined in order to maximise the rate at which they process instructions. Hardware pipelining works by implementing each of a plurality of phases of instruction execution as a single pipeline stage. Instructions flow through successive pipeline stages, in a production-line fashion, with all partially-completed instructions moving one stage forward on each processor clock cycle. Each of the execution units 30, 32 in FIG. 2 and 60, 62 in FIG. 3 is arranged as a hardware pipeline having a number of pipeline stages.

FIG. 7 shows an example of the pipeline stages that may be present in the various clusters. For simplicity, a single pipeline is shown for each cluster, although it will be appreciated that two or more pipelines may be provided in each cluster. In the pipelines of FIG. 7, instructions flow through the pipelines from left to right; thus a stage which is to the left of another stage in FIG. 7 is referred to as being before, or earlier than, that stage. The various stages in the pipelines are as follows.

VA—VLIW address stage. The address of the next instruction is computed in this stage in the master cluster.

VTIA—V-cache tags and instruction address. This stage is used to propagate the address of the next instruction from the master cluster to the slave cluster. In addition, the master cluster performs a V-tag comparison to establish whether the required instruction is in the V-cache (cache hit).

IF—instruction fetch. The VLIW instructions are fetched from memory into the pipelines in the various clusters.

D—instruction decode. The instructions are decoded to determine the type of instruction and which registers are to be the source and the destination for the instruction, and literals are extracted from the instruction.

X1—execute 1. First execution cycle.

X2—execute 2. Second execution cycle.

X3—execute 3. Third execution cycle.

C—commit. The instruction result is obtained and, unless an exception has occurred, it will commit to causing a change to the processor state.

In the VLIW instruction set which is used by present processor there are several instructions which can directly affect the sequencing of subsequent VLIW-packets. These VLIW instructions are referred to as control instructions. Such control instructions are always scheduled to be processed by the master cluster. Examples of such control instructions are as follows:

branch—this instruction causes the program to branch to another address. If this instruction is executed, earlier instructions in the pipelines will usually need to be discarded.

loop—this instruction initiates a VLIW loop. If this instruction is executed, it may be necessary to discard earlier instructions from the pipelines if the loop body is less than three packets and the total number of iterations is greater than one.

rv (return from VLIW mode)—this instruction causes the processor to change from VLIW mode to scalar mode. If this instruction is executed, earlier instructions in the pipelines need to be discarded.

exit—this instruction causes the program to exit early from a loop. Depending on the way in which the exit is handled, one or more earlier instructions in the pipelines may need to be discarded.

Each of the above control instructions, if executed, may cause changes to the sequencing of subsequent instruction packets. However, such an instruction will only execute if the guard predicate corresponding to that instruction is true. The state of the guard predicate is assessed when the instruction is in the X1 stage. By that stage, potentially unwanted instructions from instruction packets following the packet with the control instruction will have already been issued to the various pipelines. Thus, if such a control instruction is executed, it may be necessary to discard subsequent instructions that have already been loaded into the pipelines, and to undo any effects of those instructions. As will now be explained, discarding such unwanted instructions may be difficult for a variety of reasons.

A first difficulty in discarding any unwanted instructions arises due to the fact that corresponding instructions (i.e. instructions from the same instruction packet) in different clusters may not always be in the same pipeline stage at the same time. This may be due to, for example, the way in which stall signals are communicated in the processor. As disclosed in co-pending United Kingdom patent application number 0027294.8 in the name of Siroyan Limited, the entire contents of which are incorporated herein by reference, corresponding instructions in different pipelines may be allowed to become temporarily out of step with each other, in order to allow time for a stall signal to be distributed between pipelines. In embodiments of the present invention, a stall signal which is generated by one cluster takes effect in that cluster on the next clock edge, but does not take effect in other clusters until one clock cycle after that. This allows at least one clock cycle for the stall signal to be distributed throughout the processor. The result of this stalling mechanism is that the instructions in different pipelines may not be aligned with each other.

An example of unaligned stale packets is shown in FIG. 8. In this example it is assumed that the X2 stages in clusters 0 and 2 have both generated stall signals. These signals cause clusters 0 and 2 to stall immediately, while clusters 1 and 3 are stalled one clock cycle later. As a result, the instructions in clusters 1 and 3 advance one stage ahead of the corresponding instructions in clusters 0 and 2. If a control instruction (such as an exit instruction, as shown in FIG. 8) is acted on in the X1 stage of cluster 2, then it is necessary to discard the instructions in the VTIA, IF and D stages of clusters 0 and 2, and from the VTIA, IF, D and X1 stages of clusters 1 and 3. The logic required to deleted the unwanted packets is therefore complex due to the fact that the instructions in the pipelines may not be aligned.

In addition to the non-alignment problem, the number of packets which are stale and need to be deleted depends on the type of control instruction. In the case of a branch instruction or a rv instruction, all subsequent packets that have already issued are unwanted. In the case of a loop instruction, the first unwanted packet can vary depending on factors such as the loop size, number of loop iterations and number of epilogue loop iterations. For example, if the loop size is one, and the number of loop iterations is greater than one, then the first subsequent packet could be retained but the second discarded. If the loop size is two then the first two subsequent packets could be retained. Alternatively, if the number of iterations is only one then all packets could be retained since the order of packet issue would remain unchanged.

In the case of an exit instruction, the number of packets which need to be discarded depends on loop size, number of loop iterations remaining, the number of epilogue loop iterations, and the exit instruction's position relative to the end of the loop body. In addition to deciding which packets are unwanted, predicate registers in other pipelines may have to be updated, to allow individual instructions in subsequent packets which are not deleted to become guarded false. This is necessary due to the mechanism of shifting predicates during the epilogue shut down phase of a loop. It may be necessary to create additional stall cycles while globally broadcasting the information required to update the predicate registers, since the subsequent instructions will require the updated predicate information before they can continue.

The register files to which the execution units have access may use a mechanism known as rotation, in order to allow the program to use the same register address on subsequent iterations of a loop. If an unwanted instruction in a cluster has caused a register file to rotate, then that register file must be returned to its previous (un-rotated) state. This is also made more complicated by the packet non-alignment problem, and the additional stalls required.

Early Resolving Control Transfer Instructions

In an embodiment of the present invention, the pipeline structure of the processor is modified so that certain control transfer instructions can be fetched and decoded early in the pipeline. These instructions are referred to herein as early resolving instructions. When these instructions are detected, they prevent the movement of subsequent packets through the pipelines until the guard predicate and any other data dependencies have been resolved. This avoids the need to delete specific unwanted instructions in other clusters and to correct any unwanted rotations in register files.

In an embodiment of the invention, the structure of the master cluster is modified so that the master cluster's portion of a VLIW packet can be fetched (and validated using the V-Cache tags) one cycle ahead of the slave's. This can be done in parallel with the propagation of the cache index to all the slave clusters. The instruction can then be partially decoded in the master cluster in order to initiate a stall before any subsequent instructions are fetched by the slave clusters. Whenever an early resolving instruction is detected, the master cluster allows the packet containing the instruction to continue with a cache hit signal. The cache hit signal is broadcast to the slave clusters in the IF stage in parallel with the slave clusters' instruction fetches. The VTIA stage is stalled to hold off any subsequent packets and the packet containing the early resolving instruction is allowed to propagate through to the X1 stage followed by several bubbles (or no-operation instructions/V-cache miss signals) in all pipelines.

FIG. 9 shows parts of a master cluster 14 and a slave cluster 16 in accordance with an embodiment of the invention. Each of the clusters comprises a pipeline divided into a plurality of pipeline stages, namely VA, VTIA, IF, D and X1. For clarity, only one pipeline is shown in each cluster, and later stages and other slave clusters are not shown.

Master cluster 14 comprises address computation unit 100, VLIW program counter 102, tag fetching unit 104, instruction fetching unit 106, tag matching unit 108, pre-decode unit 110, hit register 112, instruction register 114, hit register 116, decode unit 118 and execute unit 120. Slave cluster 16 comprises instruction fetching unit 122, decode unit 124, hit register 126 and execute unit 128. The processor also comprises stall control unit 130 which is distributed between the various clusters.

In operation, the address of a next instruction packet is computed in the VA stage of the master cluster by the address computation unit 100. This address is provided to the VLIW program counter 102. At the same time, a V-cache index derived from the address is provided to tag fetching unit 104 and instruction fetching unit 106. The V-cache index consists of a number of bits from the address, which are used for accessing the V-cache.

The address computed by the address computation unit 100 is loaded into the VLIW program counter 102 in the VTIA stage of the master cluster. At the same time, the V-cache index is loaded into the tag fetching unit 104 and the instruction fetching unit 106. The tag fetching unit 104 and the instruction fetching unit 106 fetch respectively the cache tag and the instruction from the address in the V-cache given by the V-cache index. The tag matching unit 108 compares the address contained in the cache tag with the address stored in the VLIW program counter 102, to determine whether the required instruction packet is in the instruction cache. The tag matching unit 108 outputs a cache hit signal which indicates whether or not the required instruction is in the V-cache. Also in the VTIA stage, the instruction which was fetched by the instruction fetching unit 106 is partially decoded in pre-decode unit 110, to determine whether the instruction is one of a number of predetermined control transfer instructions. An output of the pre-decode unit 106 is fed to stall control unit 130. If the instruction is determined to be such an instruction, then the stall control unit 130 stalls stage VTIA in the master cluster and all preceding stages on the next clock cycle. Subsequent instructions are then prevented from moving through the pipeline until the stall is removed.

In the IF stage, the V-cache index is loaded into the instruction fetching unit 122 in the slave cluster. The instruction fetching unit 122 then fetches the instruction from the address in its V-cache partition which is given by the V-cache index. In the same stage, the instruction which was fetched by the instruction fetching unit 106 is loaded into instruction register 114. Since the master cluster has already fetched its instruction in the VTIA stage, it is not necessary for it to fetch the instruction in the IF stage, and so the instruction in the master cluster is simply held in the instruction register 114 to allow the instructions in the slave clusters to re-align with those in the master cluster. Also in the IF stage, the cache hit signal is loaded into the hit register 112. If the hit register 112 indicates that a cache miss occurred, then the V-cache is refilled by the code decompression unit (not shown in FIG. 9).

The instructions in the various pipelines are decoded in the D stage of the various clusters by the decode units 118, 124. The decode units 118, 124 determine the type of instruction and which registers are to be the source and the destination for the instruction, and extract literals from the instruction. In the X1 stage, the decoded instructions are fed to the execution units 120, 128 for execution. In this stage, the predicate registers are checked to determine whether or not the instructions are to be executed. The hit signal also progresses through the pipelines in hit registers 116, 126, to indicate whether or not the instructions are valid.

If a stall is asserted by stall control unit 130 in the VTIA stage of the master cluster, then the VTIA stage and all preceding stages in the master cluster are stalled on the next clock cycle. By then the early resolving instruction has moved to the IF stage of the master cluster. At the same time, the corresponding instruction in the slave cluster is fetched by instruction fetch unit 122. Thus, the early resolving instruction in the master cluster and the corresponding instruction in the slave cluster are allowed to progress through the pipelines, while subsequent instructions are held off by the stall signal.

In the clock cycle after the stall is asserted, the early resolving instruction progresses to the D stage, while the subsequent instruction is held in the VTIA stage due to the stall signal. The hit register 112 is reset, indicating that any instruction in register 114 is to be ignored. Any instruction which is fetched by instruction fetch unit 122 in that clock cycle must also be ignored. This is achieved by feeding the output of hit register 114 to hit register 126 in the next clock cycle.

In the next clock cycle, the early resolving instruction has moved to the X1 stage of the master cluster, and hit registers 112 and 116 are both reset, indicating that the instructions in both the IF stage and D stage of the master cluster are to be ignored. Thus a two-stage bubble appears in the pipeline between the early resolving instruction and the subsequent instruction. Any subsequent instruction which is loaded into the slave cluster also has a "miss" signal associated with it, so that a two-stage bubble also appears in the slave cluster.

If a control transfer instruction is executed in the X1 stage of the master cluster, then the subsequent instructions would normally have to be flushed from the various pipelines. However, in the present embodiment, since the master cluster is stalled by the stall control unit 130, these unwanted instructions are prevented from being loaded into the pipelines in the first place, and instead "miss" signals are fed into the respective hit registers. Therefore, in the present embodiment, it is not necessary to implement a complicated mechanism for removing the unwanted instructions from the pipelines. Once the control transfer instruction has been acted on, it is possible to remove the stall signal, since the correct addresses will be computed by the address computation unit 100 in subsequent clock cycles.

In the present embodiment, the next instruction after the early resolving instruction is held in the VTIA stage of the master pipeline, while the early resolving instruction progresses through to the X1 stage. Bubbles, or no-operation instructions, are inserted into the IF and D stages. If the early resolving instruction is not executed (for example, because it is guarded false) then the next instruction, which is in the VTIA stage, can still be used. In this case, since there are two bubbles between the early resolving instruction and the next instruction, two clock cycles will be wasted. However, if the early resolving instruction is executed, then the instruction held in the VTIA stage of the master pipeline is squashed, and the next instruction is re-loaded based on the next address calculated by the address computation unit 100. The mechanism needed to squash the instruction held in the VTIA stage can be implemented easily, because it is always the VTIA stage in the master cluster which contains the instruction to be squashed.

Although the mechanism described above results in two wasted clock cycles in cases where the control transfer instruction is not executed, this is considered acceptable, particularly in cases where the instruction is more likely to be guarded true than false. In such cases the saving made by not needing to provide the mechanism for flushing all pipelines of unwanted instructions outweighs the disadvantage of occasionally having wasted clock cycles.

The mechanism described above is illustrated in FIG. 10, using the example of a loop instruction. In FIG. 10(*a*) the loop instruction is in the IF stage, a cache hit signal is broadcast to the slave clusters, and a stall is applied to the VTIA stage. In FIG. 10(*b*), the loop instruction is in the X1 stage. Bubbles (no-operation instructions) have appeared in the IF and D stages due to the stall in the VTIA stage. The next instruction, in this case lb1 (loop body 1), is held in the VTIA stage. The guard predicate of the loop instruction is examined, and the VTIA stall is removed.

If the loop instruction is acted on, then the lb1 instruction in the VTIA stage is the first instruction of the loop body, and could potentially still be used from the VTIA stage. However, all of the loop context registers also need to be set up in order to start the loop sequencing correctly. Hence, in the present embodiment, this instruction is discarded regardless and lb1 is re-issued as the next instruction.

FIGS. 11 to 13 show examples of the stalling conditions for loop, branch and rv (return from VLIW mode) instructions respectively. In FIGS. 11 to 13, successive rows indicate the contents of the various pipeline stages in the master cluster on successive clock cycles. Referring to FIG. 11, in the first clock cycle a loop instruction is detected in the VTIA stage. In the second clock cycle the VTIA stage is stalled, so that the instruction lb1 (loop body 1) is held up in the VTIA stage. In the third clock cycle a bubble appears in the IF stage due to the stall. In the fourth clock cycle a further bubble appears, and the loop instruction is resolved in the X1 stage. In this example, the loop instruction is guarded true and the instruction is executed. The stall is then removed. In the fifth clock cycle, the lb1 instruction which was held in VTIA is squashed and the instruction is reloaded from the VA stage. As a consequence, a further bubble appears in the pipeline. In the sixth and seventh clock cycles the instructions continue their progress through the pipeline, but with three bubbles now in the pipeline.

FIG. 12 shows the stalling conditions when a branch instruction is detected. The mechanism is similar to that described with reference to FIG. 10, except that in the fifth clock cycle, the next instruction (instruction a) is squashed and the instruction at the branch target (bt) is loaded into the VTIA stage.

FIG. 13 shows the stalling conditions when an rv instruction is detected. In this case, subsequent instructions (instructions a, b and c) which are loaded into the pipeline are squashed, until the rv instruction reaches the C stage.

The above examples assume that the control transfer instruction is guarded true. If the control transfer instruction were guarded false, then the instruction held in the VTIA stage would not be squashed in the fifth clock cycle. As a consequence that instruction would be allowed to progress through the pipeline, and only two bubbles would appear in the pipeline. Thus, only two clock cycles being wasted in cases where the control transfer instruction is not executed.

The early resolving instruction decoding mechanism and the associated V-cache pipeline design results in a short and efficient pipeline for performing both instruction fetching and the broadcasting of global signals (cache index in the VTIA stage and cache hit in the IF stage). This may reduce the number of pipeline registers resulting in a lower chip area and lower power consumption. Short branch penalties may be incurred while waiting for branch instructions to be predicated in the X1 stage of the processor, which may result in faster processing.

Although the above description relates, by way of example, to a clustered VLIW processor it will be appreciated that the present invention is applicable to any processor having at least two parallel pipelines. Thus the invention may be applied to parallel processors other than VLIW processors, and to processors not having clustered pipelines. A processor embodying the present invention may be included as a processor "core" in a highly-integrated "system-on-a-chip" (SOC) for use in multimedia applications, network routers, video mobile phones, intelligent automobiles, digital television, voice recognition, 3D games, etc.

The invention claimed is:

1. A processor comprising a plurality of parallel pipelines which perform a series of operations on instructions from an instruction packet passing through the plurality of parallel pipelines, wherein each of said plurality of pipelines comprises a plurality of stages including an instruction fetch stage, a decode stage after said instruction fetch stage and at least one execute stage after said decode stage, and a first one of said plurality of parallel pipelines comprises a pre-decoder arranged in a stage of the first pipeline before said decode stage of the first pipeline and before a stage of said first pipeline corresponding to the instruction fetch stage of a second one of said plurality of parallel pipelines to at least partially decode an instruction in the first pipeline before a subsequent instruction from said instruction packet is fetched by said instruction fetch stage of said second one of said plurality of parallel pipelines, the pre-decoder being arranged to determine whether the instruction is a sequence-altering instruction which, if executed, may cause a sequence of subsequent instructions to be different from that if the instruction was not executed, the pre-decoder partially decoding the instruction in the first pipeline to determine whether the instruction is one of a number of predetermined control transfer instructions, the processor further comprising stall control circuitry connected operatively with said pre-decoder, and when said pre-decoder determines that the instruction is such a sequence-altering instruction, the stall control circuitry causes the sequence-altering instruction to progress through the first pipeline to reach the execute stage thereof, whilst stalling the progress of subsequent instructions of the instruction packet until the sequence-altering instruction has been resolved, whereby in the event that the sequence-altering instruction is executed, instructions belonging to subsequent instruction packet(s) do not need to be removed from the plurality of parallel pipelines.

2. The processor according to claim 1, wherein the pre-decoder is arranged to determine whether the instruction is one of a predetermined set of instructions.

3. The processor according to claim 2, wherein the predetermined set of instructions comprises instructions that may only be executed by the first pipeline.

4. The processor according to claim 1, wherein the execute stage of said first pipeline comprises circuitry which determines whether an instruction in the execute stage is to be executed, and the stall control circuitry is arranged to release a stall when it has been determined whether an instruction which caused the stall is to be executed.

5. The processor according to claim 4, further comprising circuitry which deletes a subsequent instruction if it is determined that the instruction which caused the stall is to be executed.

6. The processor according to claim 1, wherein the processor is arranged such that, in dependence on an output of the pre-decoder, an instruction from a subsequent instruction packet is prevented from being loaded into the second pipeline in an executable form.

7. The processor according to claim 1, wherein the decode stage in the first pipeline fully decodes an instruction.

8. The processor according to claim 1, wherein each of the plurality of parallel pipelines has instruction fetch circuitry which fetches an instruction to be executed, wherein the instruction fetch circuitry in the first pipeline is in an earlier pipeline stage than the instruction fetch circuitry in the second pipeline.

9. The processor according to claim 8, wherein the instruction fetch circuitry in the first pipeline is in the same pipeline stage as the pre-decoder.

10. The processor according to claim 1, wherein the processor is arranged such that corresponding instructions in different pipelines may become unaligned for at least one clock cycle.

11. The processor according to claim 1, the processor comprising a plurality of pipeline clusters, each cluster comprising a plurality of pipelines, the first pipeline being in a first cluster and the second pipeline being in a second cluster.

12. The processor according to claim 1, the processor being a VLIW processor in which instructions are issued in parallel to the plurality of pipelines.

13. A method of operating a processor, the processor comprising a plurality of parallel pipelines which perform a series of operations on a group of instructions passing through the plurality of parallel pipelines, each of said plurality of pipelines comprising a plurality of stages including an instruction fetch stage, a decode stage after said instruction fetch stage and at least one execute stage after said decode stage, the method comprising employing a stage of a first one of said plurality of parallel pipelines, arranged before said decode stage of the first pipeline and before a stage of said first pipeline corresponding to said instruction fetch stage of a second one of said plurality of parallel pipelines, to at least partially decode an instruction in the first pipeline before a subsequent instruction is fetched by said second pipeline, the at least partial decoding comprising determining whether the instruction is a sequence-altering instruction which, if executed, may cause a sequence of subsequent instructions to be different from that if the instruction was not executed, the at least partial decoding determining whether the instruction is one of a number of predetermined control transfer instructions, and the method further comprising: when the decode stage determines, based on said at least partial decoding, that the instruction is such a sequence-altering instruction, the decode stage causes the instruction to progress through the first pipeline to reach the execute stage thereof whilst stalling the progress of subsequent instructions until the sequence-altering instruction has been resolved, whereby in the event that the sequence-altering instruction is executed instructions belonging to subsequent group(s) of instructions do not need to be removed from the plurality of parallel pipelines.

14. The method according to claim 13, wherein said at least partial decoding comprises determining whether the instruction is one of a predetermined set of instructions.

15. The method according to claim 14, wherein the predetermined set of instructions comprises instructions that may only be executed by the first pipeline.

16. The method according to claim 13, further comprising:

determining, in said execute stage in the first pipeline, whether an instruction in said execute stage in the first pipeline is to be executed; and releasing a stall when it has been determined whether an instruction which caused the stall is to be executed.

17. The method according to claim 16, further comprising deleting a subsequent instruction if it is determined that the instruction which caused the stall is to be executed.

18. The method according to claim 13, wherein an instruction from a subsequent instruction packet is prevented from being loaded into the second pipeline in an executable form in dependence on a result of the at least partial decoding of the instruction.

\* \* \* \* \*